US010118652B2

(12) United States Patent
Maertens et al.

(10) Patent No.: US 10,118,652 B2
(45) Date of Patent: Nov. 6, 2018

(54) HINGED TOP DOOR FOR TRAILER

(71) Applicant: Titan Trailers Inc., Delhi (CA)

(72) Inventors: Andrew Joseph Maertens, Delhi (CA); Michael Kloepfer, Delhi (CA)

(73) Assignee: Titan Trailers Inc., Delhi, Ontario (CA)

(*) Notice: Subject to any disclaimer, the term of this patent is extended or adjusted under 35 U.S.C. 154(b) by 0 days.

(21) Appl. No.: 15/550,247

(22) PCT Filed: May 14, 2015

(86) PCT No.: PCT/CA2015/050439
§ 371 (c)(1),
(2) Date: Aug. 10, 2017

(87) PCT Pub. No.: WO2016/179680
PCT Pub. Date: Nov. 17, 2016

(65) Prior Publication Data
US 2018/0050739 A1 Feb. 22, 2018

(51) Int. Cl.
B62D 33/04 (2006.01)
B60J 7/16 (2006.01)
(Continued)

(52) U.S. Cl.
CPC ............ B62D 33/04 (2013.01); B60J 7/1621 (2013.01); B62D 53/06 (2013.01); B62D 63/08 (2013.01);
(Continued)

(58) Field of Classification Search
CPC ........ B62D 33/04; B62D 53/06; B62D 63/06; B62D 63/08; B62D 63/061; B60P 7/02;
(Continued)

(56) References Cited

U.S. PATENT DOCUMENTS 1,925,665 A * 9/1933 Judd ...................... B62D 33/04
410/26
2,531,140 A * 11/1950 Linde .................... B60J 7/1614
108/145
(Continued)

FOREIGN PATENT DOCUMENTS

CA 1225685 A 8/1987

OTHER PUBLICATIONS

International Patent Application No. PCT/CA2015/050439, International Preliminary Report on Patentability dated Apr. 26, 2017.
(Continued)

Primary Examiner — Gregory A Blankenship
(74) Attorney, Agent, or Firm — McCarter & English, LLP

(57) ABSTRACT

A top-loadable cargo trailer has one or more top doors mounted to a container using hinge assemblies which are located entirely within a perimeter of the container when the top door is closed. In this way, no part of the full width, length, or height of the container is taken up by overhanding hinges, and in jurisdictions limiting container width, length, and height no amount of container volume is sacrificed due to hinge overhang. The hinge assemblies have a compound, or dual hinge biased by a resistance mechanism such as a coil spring to provide an orderly opening and closing sequence of the top door. When fully open, the top door hangs vertically flush against the container wall, thus minimize hazard to works and equipment moving about the container.

19 Claims, 16 Drawing Sheets

(51) Int. Cl.
*E05D 3/12* (2006.01)
*B62D 63/08* (2006.01)
*E05D 7/00* (2006.01)
*B62D 53/06* (2006.01)
*E05F 1/12* (2006.01)
*E05F 15/63* (2015.01)

(52) U.S. Cl.
CPC ............... *E05D 3/125* (2013.01); *E05D 7/00* (2013.01); *E05F 1/1215* (2013.01); *E05F 15/63* (2015.01); *E05Y 2201/492* (2013.01); *E05Y 2600/634* (2013.01); *E05Y 2900/516* (2013.01)

(58) Field of Classification Search
CPC ....... B60J 7/1607; B60J 7/1621; E05D 3/125; E05D 3/127; E05F 3/1207; E05F 3/1215; E05F 15/63
USPC ...... 296/100.06, 100.08, 100.1, 185.1–186.5
See application file for complete search history.

(56) References Cited

U.S. PATENT DOCUMENTS

| | | | |
|---|---|---|---|
| 3,186,756 A * | 6/1965 | Barker | B60J 7/041 16/363 |
| 3,977,720 A * | 8/1976 | Schreiberg | B60P 3/07 296/100.03 |
| 4,210,358 A | 7/1980 | Hamlet et al. | |
| 4,302,044 A * | 11/1981 | Sims | B60J 7/141 105/378 |
| 4,489,975 A * | 12/1984 | Fredin | B60J 5/0498 105/378 |
| 4,627,658 A * | 12/1986 | Vold | B60J 7/1621 105/377.03 |
| 6,152,511 A * | 11/2000 | Gustafson | B60P 3/41 296/14 |
| 6,402,224 B1 | 6/2002 | Monaco et al. | |
| 6,695,390 B2 * | 2/2004 | Bucco Morello | B60J 5/0498 160/210 |
| 7,384,089 B1 * | 6/2008 | Ablang | B60J 7/141 296/100.08 |
| 7,967,357 B2 * | 6/2011 | Kloepfer | B60P 3/42 105/377.05 |
| 8,256,355 B2 | 9/2012 | Dial et al. | |
| 8,282,148 B2 * | 10/2012 | Kloepfer | B60P 3/42 105/377.05 |
| 8,876,217 B1 | 11/2014 | Medlen et al. | |
| 2004/0201249 A1 * | 10/2004 | Bush, Sr. | B60J 5/062 296/183.1 |
| 2006/0022489 A1 * | 2/2006 | Waldorf | B60J 5/0498 296/186.4 |
| 2006/0208256 A1 * | 9/2006 | Marinskiy | H01L 22/14 257/48 |
| 2018/0050739 A1 * | 2/2018 | Maertens | B62D 33/04 |

OTHER PUBLICATIONS

International Patent Application No. PCT/CA2015/050439, International Search Report and Written Opinion dated Feb. 8, 2016.

* cited by examiner

HINGED TOP DOOR FOR TRAILER

CROSS-REFERENCE TO RELATED APPLICATION

The present application is a 35 U.S.C. § 371 National Stage filing of International Application No. PCT/CA2015/050439, filed on May 14, 2015, and entitled "HINGED TOP DOOR FOR TRAILER". The entire contents of the foregoing patent application is incorporated herein by reference.

FIELD

The present disclosure relates generally to top-loadable cargo trailers.

BACKGROUND

Cargo trailers are widely used to transport various materials. For example, tipper trailers, dump trailers, and walking floor trailers, among others, are widely used to transport particulate bulk material such as gravel, stone, grain, and road salt, as well as other material such as municipal garbage or construction or industrial waste.

In some applications, trailers are loaded from a top opening of the trailer using a loader or directly from a feed source such as an overhead chute. In such case, the trailer may be provided with one, two, or more top doors which may be closed to protect the loaded material from contamination or from being disturbed or blown about or out of the trailer during transport. Each top door is typically mounted to the container along an adjoining upper edge of a sidewall of the container by means of a number of hinges.

In some conventional top-loadable cargo trailers, the top doors and hinges are configured such that the doors are not rotatable completely through 270°, with the result that in a fully open position the doors project outwardly from the sides of the container causing a hazard to workers and equipment moving about the trailer.

In other conventional top-loadable cargo trailers, the hinges project past the sidewalls of the container when the top doors are fully closed. In jurisdictions where cargo trailer widths are regulated and limited, however, and where the limitation includes any hinges such that the hinges must also fall within a regulated maximum trailer width, any overhang of the hinges results in a container having a smaller width and therefore a lesser capacity, which is a disadvantage.

There is therefore a material value in a top loadable cargo trailer wherein the top doors in a fully open position do not project outwardly so as to cause a hazard, but at the same time wherein the width of the container is maximized to enable maximum container volume.

SUMMARY

The techniques and principles disclosed herein ameliorate deficiencies or disadvantages of prior techniques, provide further advantages over prior techniques, or provide alternatives to prior techniques.

In one embodiment, a cargo trailer has a container having a wall, and a hinge assembly to mount the top door rotatably at or near an edge of the wall. The hinge assembly has a compound hinge. The compound hinge comprises a hinge bracket fixedly mounted at a first end of the hinge bracket to the wall at or near the edge of the wall, and a hinge arm hingedly coupled at a first end of the hinge arm at an elbow with a second end of the hinge bracket. The cargo trailer further has a top door hingedly mounted at a knuckle of the top door with a second end of the hinge arm.

The hinge assembly may further have a resistance mechanism coupled to the compound hinge to urge hinged rotation of the hinge arm at the elbow to a closed position of the hinge arm. In some embodiments, the resistance mechanism comprises a coil spring encircling a hinge pin passing through the elbow and an opening of a supporting bracket mounted to the wall at a supporting bracket side of the coil spring opposite an elbow side of the coil spring adjacent the elbow an anchor arm of the coil spring adjacent the supporting bracket side of the coil spring presses at the wall adjacent the supporting bracket, and an elbow arm of the coil spring at the elbow side of the coil spring hugs a surface of the hinge arm, to urge the hinged rotation of the hinge arm at the elbow to the closed position of the hinge arm.

The cargo trailer may further have a top rail at the edge of the wall, wherein the hinge assembly is mounted to the top rail. The top rail may include an indentation or offset of the wall inwardly from an outward surface of the wall so as to form a space to receive the hinge assembly. The indentation or offset may be sized and shaped such that the hinge assembly is located fully inside a vertical plane of an outward surface of the wall when the top door is in a fully closed position.

As such, the hinge assembly may be located fully inside a vertical plane of an outside surface of the wall when the top door is in a fully closed position. Also, the top door may rest flush against an outside surface of the wall when the top door is in the fully open position.

In this way, a width or length or height of the container may be maximized, with none of the width or length or height being taken up by overhand of the hinge assembly when the top door is in a full closed position. Additionally, in a fully open positioned, the top door projects minimally, if at all, from the contain wall, thus minimize any hazard to workers or equipment moving about the trailer.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures.

DETAILED DESCRIPTION

A top-loadable cargo trailer as described herein has a hinge assembly for mounting a top door of the cargo trailer to a wall of the container of the cargo trailer, which may be a sidewall or end wall. The hinge assembly is located entirely within the horizontal perimeter of the container when the top door is in a fully closed position; in other words, the hinge assembly is located entirely inside a vertical plane extending upwardly from an outside surface of the wall; in yet other words, the hinge assembly does not overhang beyond the sidewalls. As such, no pad of the full trailer width or length or height is taken up by the hinge assembly, and thus the container width, length, and height, and therefore volume, may be maximized. Moreover, in a fully open position the top door hangs vertically from the hinge assembly flush against the outside surface of the container wall. Thus, lateral projection of the top door in the fully open position is minimized, and any hazard to workers or equipment moving about the trailer is likewise minimized.

Figure 1:
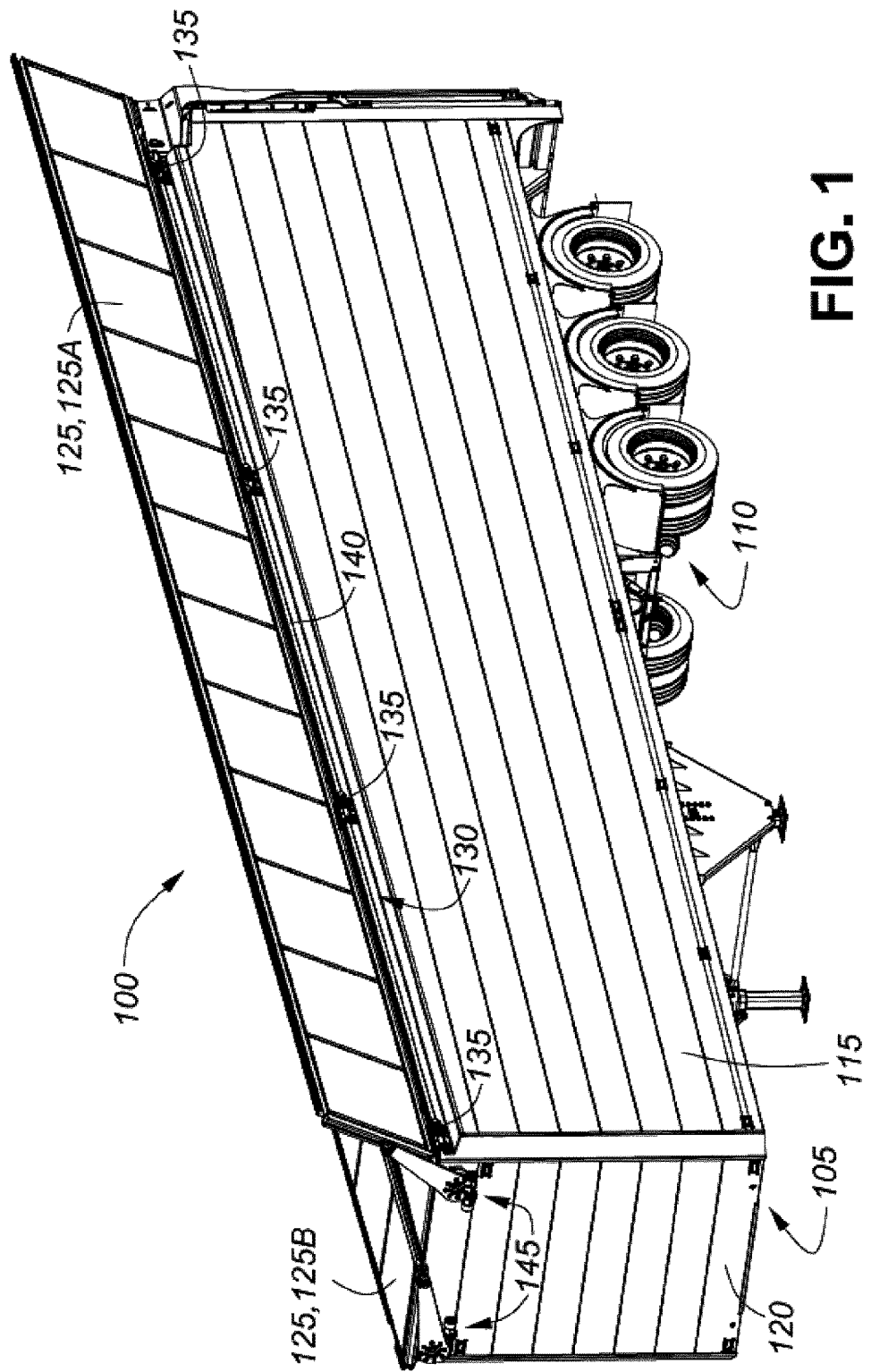
FIG. 1 is a perspective view of a cargo trailer.

A top-loadable cargo trailer 100 is shown in FIG. 1. The trailer 100 has a container 105 and a wheeled suspension 110. The container 105 has walls including opposing sidewalls 115 (far sidewall not shown), a front wall 120, a floor (not shown), an back wall or tailgate (not shown), and one or more top doors 125. In FIG. 1, a first top door 125A is shown in a partly open position, and a second top door 125B is shown in a fully closed position.

The trailer 100 may also include numerous other conventional elements and features not germane to the present techniques, but which are commonly found on conventional trailers, and so are not specifically identified herein. In addition, while the following discussion addresses only a single top door 125, it will be understood that the techniques apply equally to each of the one or more top doors 125 possessed by the trailer 100.

The top door 125 is mounted at or near an upper edge 130 of the sidewall 115 by means of one or more hinge assemblies. The sidewall 115 may be provided with a top rail 140 configured to mount the top door 125 to the side wall 115 by means of the hinge assemblies 135, as described further below the hinge assemblies may be provided in any suitable number, and positioned in any suitable positions, according to the particular application of the principles set forth herein.

Figure 2:
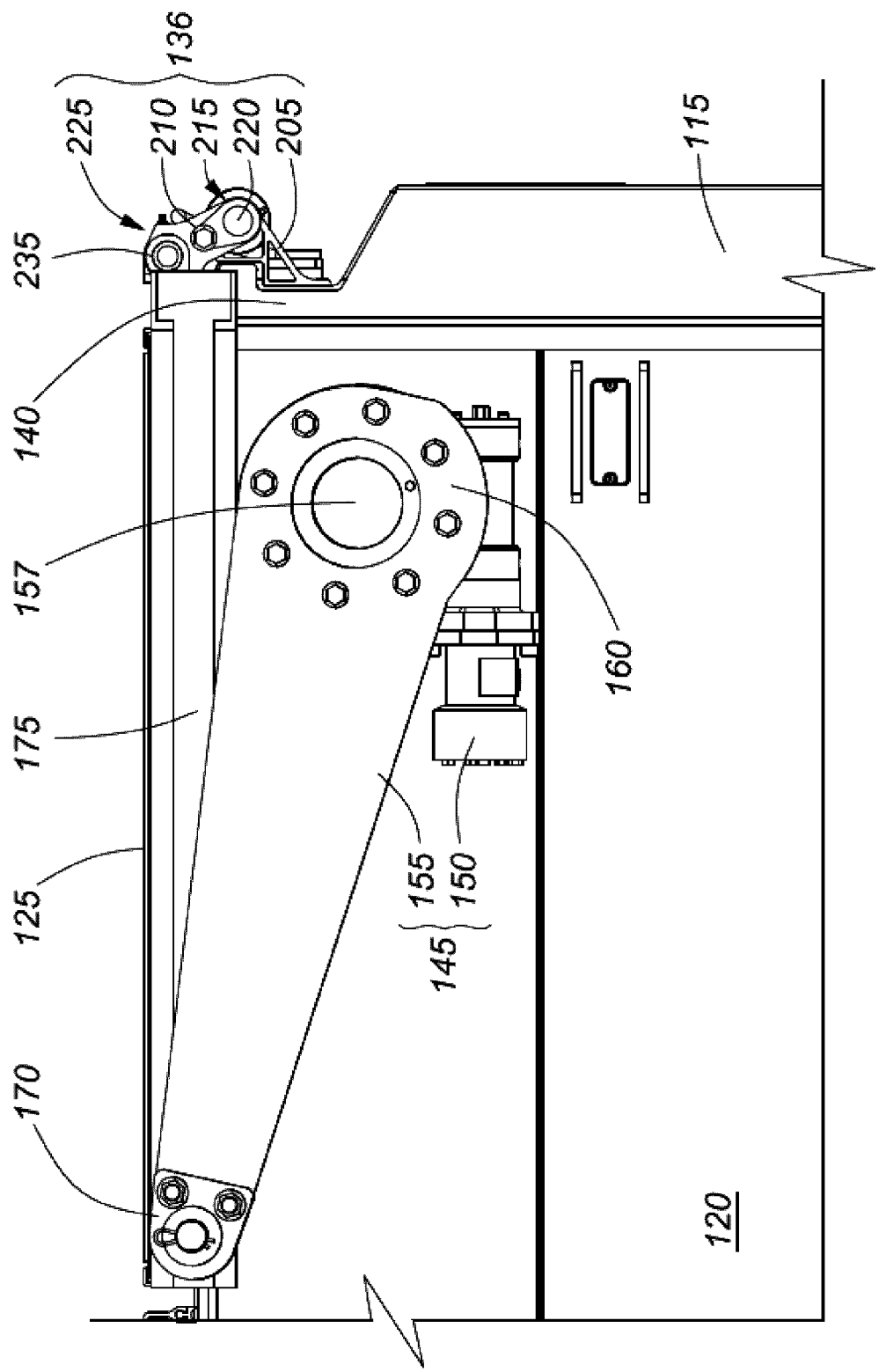
FIG. 2 is a partial end view of the cargo trailer of FIG. 1, showing a top door, hinge assembly, and top door opening mechanism in a fully closed position.

The trailer 100 further has a top door opening mechanism 145 for rotating the top door 125 from a fully closed position to a fully open position. Any suitable means may be used for this purpose. By way of example only, and without limitation, the top door opening mechanism 145 may include, as shown particularly in FIGS. 2 & 3, a motor 150 and a motor arm 155 rotatably mounted at the front wall 120 by a motor arm pivot 157 at a first end 160 of the motor arm 155 and coupled to the motor 150 to rotate the motor arm 155 about the motor arm pivot 157. A linking wheel 165 (best shown in FIG. 9) may be mounted at a second end 170 of the motor arm 155 and received in a rail or slot 175 provided or mounted at an adjacent edge 180 of the top door 125. As the motor arm 155 is rotated about the motor arm pivot 157 by the motor 150, the wheel 165 urges the top door 125 to open or close, corresponding to the rotation of the motor arm 155 about the motor arm pivot 157, while rolling or sliding within the top door 125 slot 175.

Figure 3:
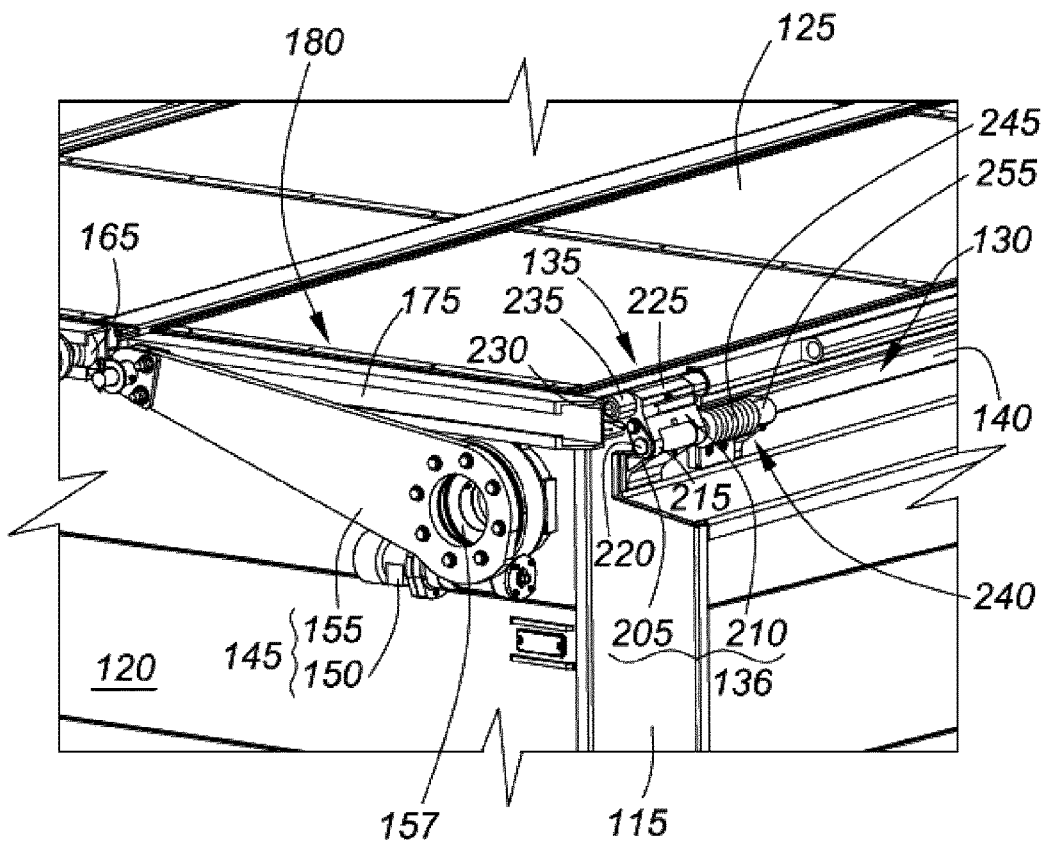
FIG. 3 is a partial rear perspective view of the cargo trailer of FIG. 1, showing the top door, hinge assembly, and top door opening mechanism in the fully closed position.

With particular reference to FIGS. 2-5, the hinge assembly 135 is now described. As shown in FIG. 3, the hinge assembly 135 includes a compound hinge 136 having a hinge bracket 205 mounted at the upper edge 130 of the sidewall 115, which may be at the top rail 140 of the sidewall 115. The compound hinge 136 further has a hinge arm 210 hingedly coupled at a first end 215 of the hinge arm 210 to the hinge bracket 205 by means of a hinge pin 220 passing through aligned openings in the hinge bracket 205 and the first end 215 of the hinge arm 210, so as to form an elbow 222 of the compound hinge 136. The hinge arm 210 is hingedly coupled at a second end 225 of the hinge arm 210 at an adjacent edge of the top door 125, by means of a door pin 230 passing through aligned openings in the second end 225 of the hinge arm 210 and a cooperating door knuckle 235.

The hinge bracket 205 and the hinge arm 210, along with the hinge pin 220 and door pin 230, may thus be understood to constitute a compound, dual, or double hinge, inasmuch as the top door 125 is hingedly rotatable at the door knuckle 235 about the second end 225 of the hinge arm 210, and the hinge arm 210 is hingedly rotatable at its first end 215 about the elbow 222 with the hinge bracket 205.

The hinge assembly 135 may also include a resistance mechanism 240 configured to urge the hinge arm 210 toward, or otherwise resist movement of the hinge arm 210 from, a first position, wherein the hinge arm 210 is in the first position when the top door 125 is in a fully closed position. Accordingly, the first position of the hinge arm 210 may also be termed a fully closed position of the hinge arm 210. The resistance mechanism 240 is thus configured to resist hinged rotation of the hinge arm 210 at its first end 215 about the elbow 222 while the top door 125 is rotated about door knuckle 235.

Figure 4:
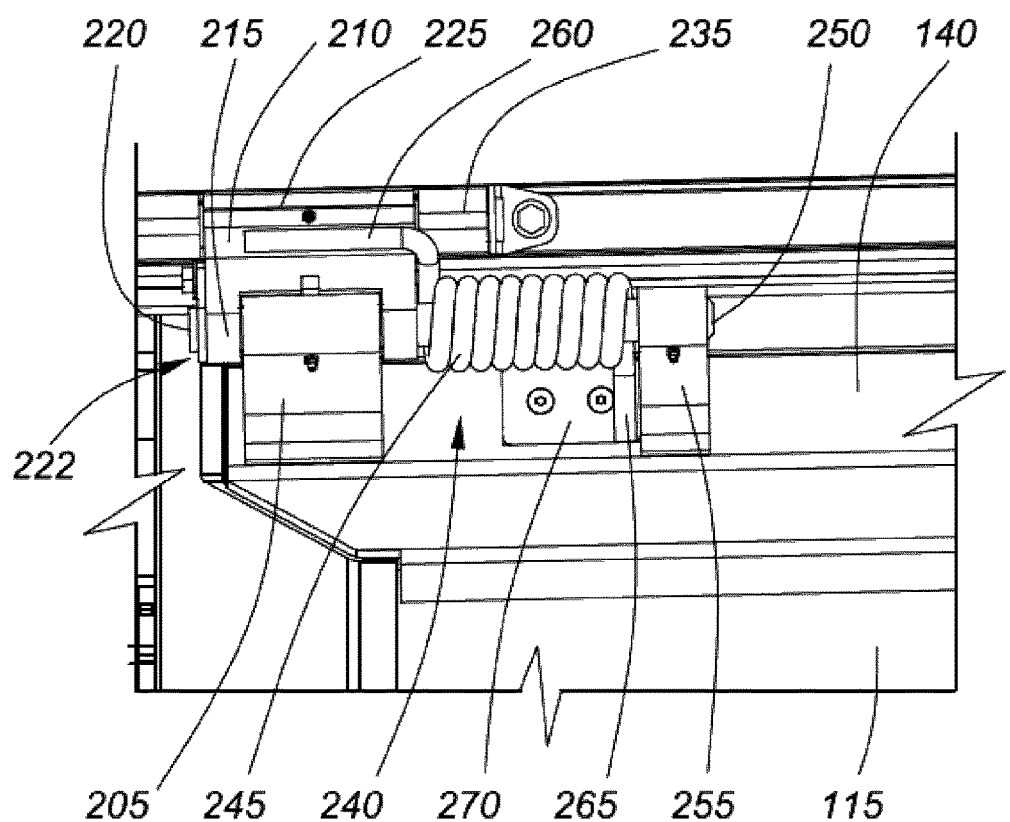
FIG. 4 is a partial side view of the cargo trailer of FIG. 1, showing the top door and hinge assembly in the fully closed position.
Figure 5:
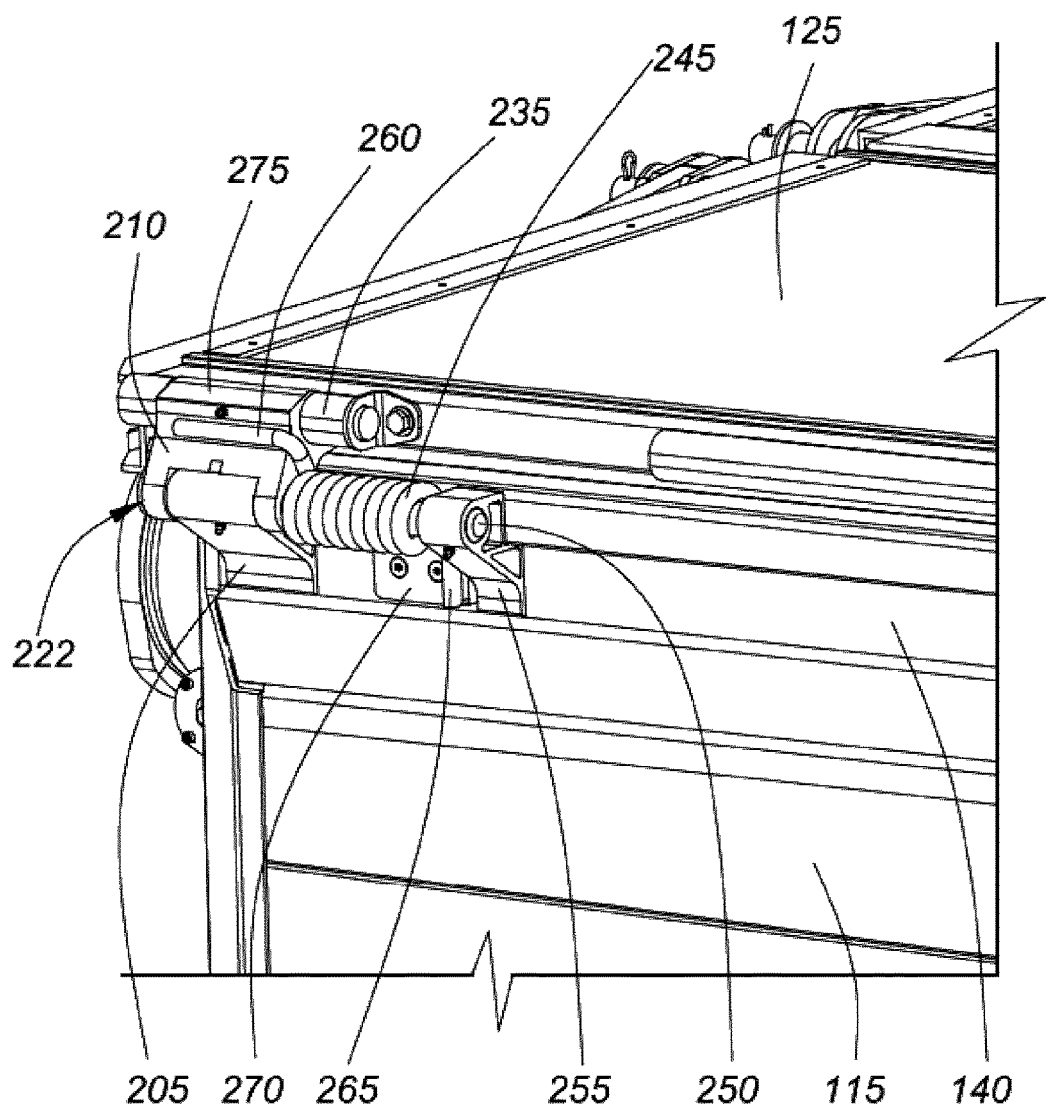
FIG. 5 is a partial front perspective view of the cargo trailer of FIG. 1, showing the top door and hinge assembly in the fully closed position.

In one embodiment, as shown particularly in FIGS. 4 & 5, the resistance mechanism 240 may include a coil spring 245 wrapped around the hinge pin 220, which may include a hinge pin extension 250 extending beyond the elbow 222 between the hinge bracket 205 and the hinge arm 210 to pass through the coil spring 245 and an aligned opening of a supporting bracket 255 mounted at the upper edge 130 of the sidewall 115, which may be at the top rail 140 of the sidewall 115. The coil spring 245 may include a first arm 260 which hugs and presses against the hinge arm 210 and a second arm 265 which presses at the sidewall 115, which may be at or near the upper edge 130 of the sidewall 115, and may be a surface of the top rail 140. The second arm 265 may press at the sidewall 115 near or adjacent the supporting bracket 255, which may thus be termed a support bracket side of the coil spring 245.

One or more pads or spacers 270 may be mounted or otherwise provided between the sidewall 115, which may be particularly a surface of the top rail 140, and the second arm 265 of the coil spring 245, to be sandwiched by the second arm 265 and the sidewall 115. The thickness and/or number of pads or spacers 270 may be selected, in combination with the selection of the coil spring 245, to produce a desired resistance behaviour of the resistance mechanism 240. A length of the coil spring 245 along the hinge pin extension 250, and a spacing of the hinge bracket 205 and the supporting bracket 255 along the hinge pin extension 250, may be selected such that the coil spring 245 contacts an adjacent surface of the hinge bracket 205 near the first arm 260, which may be termed an elbow side of the coil spring 245, and also contacts an adjacent surface of the supporting bracket 255 near the second arm 265, such that the hinge bracket 205 and supporting bracket 255 sandwich the coil spring 245 and resist movement of the coil spring 245 along the hinge pin extension 250. In other words, the hinge bracket 205 and the supporting bracket 255 may be sized and positioned in order to hold the coil spring 245 in place on the hinge pin extension 250, and in this way minimize jostling or other movement of the coil spring 245 thereby to minimize wear or damage to the coil spring 245 during movement of the trailer 100 or opening and closing of the top door 125.

Figure 14:
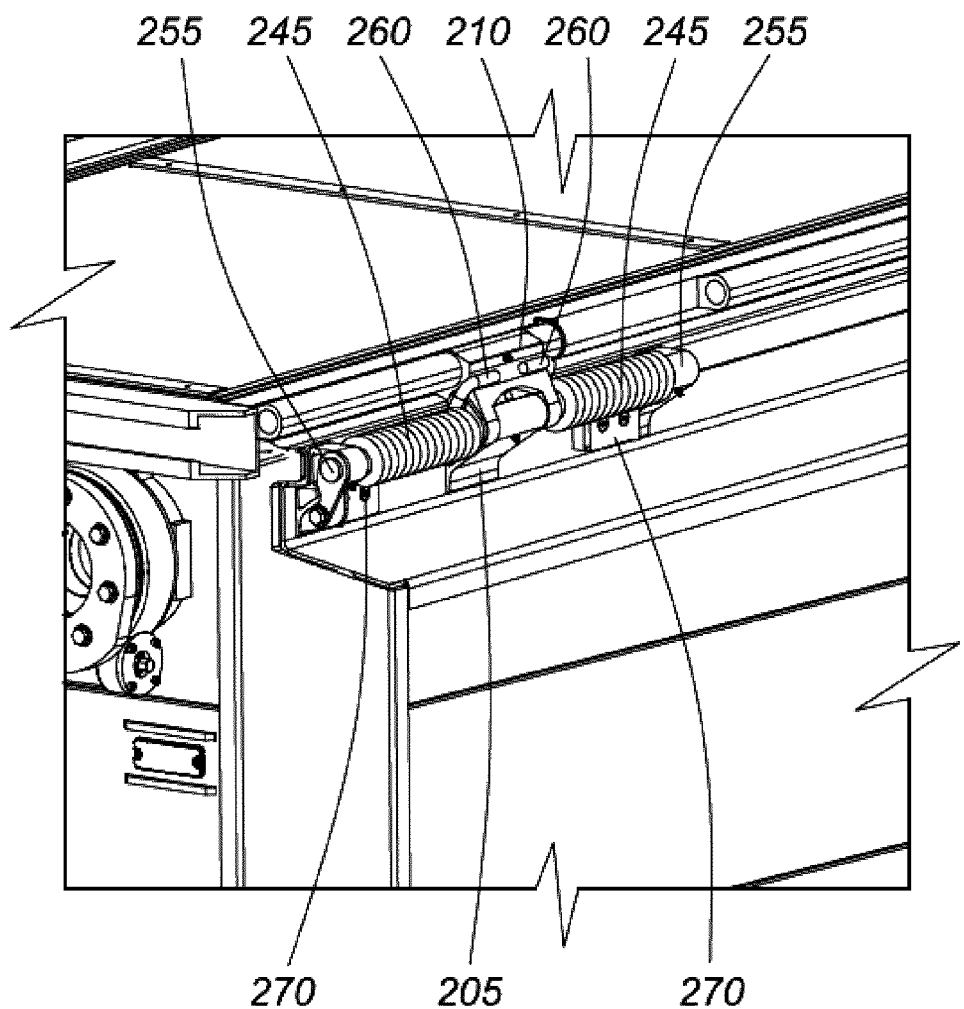
FIG. 14 is a partial rear perspective view of a cargo trailer showing the top door and hinge assembly in a fully closed position, wherein a resistance mechanism of the hinge assembly has two coil springs and two supporting brackets.
Figure 15:
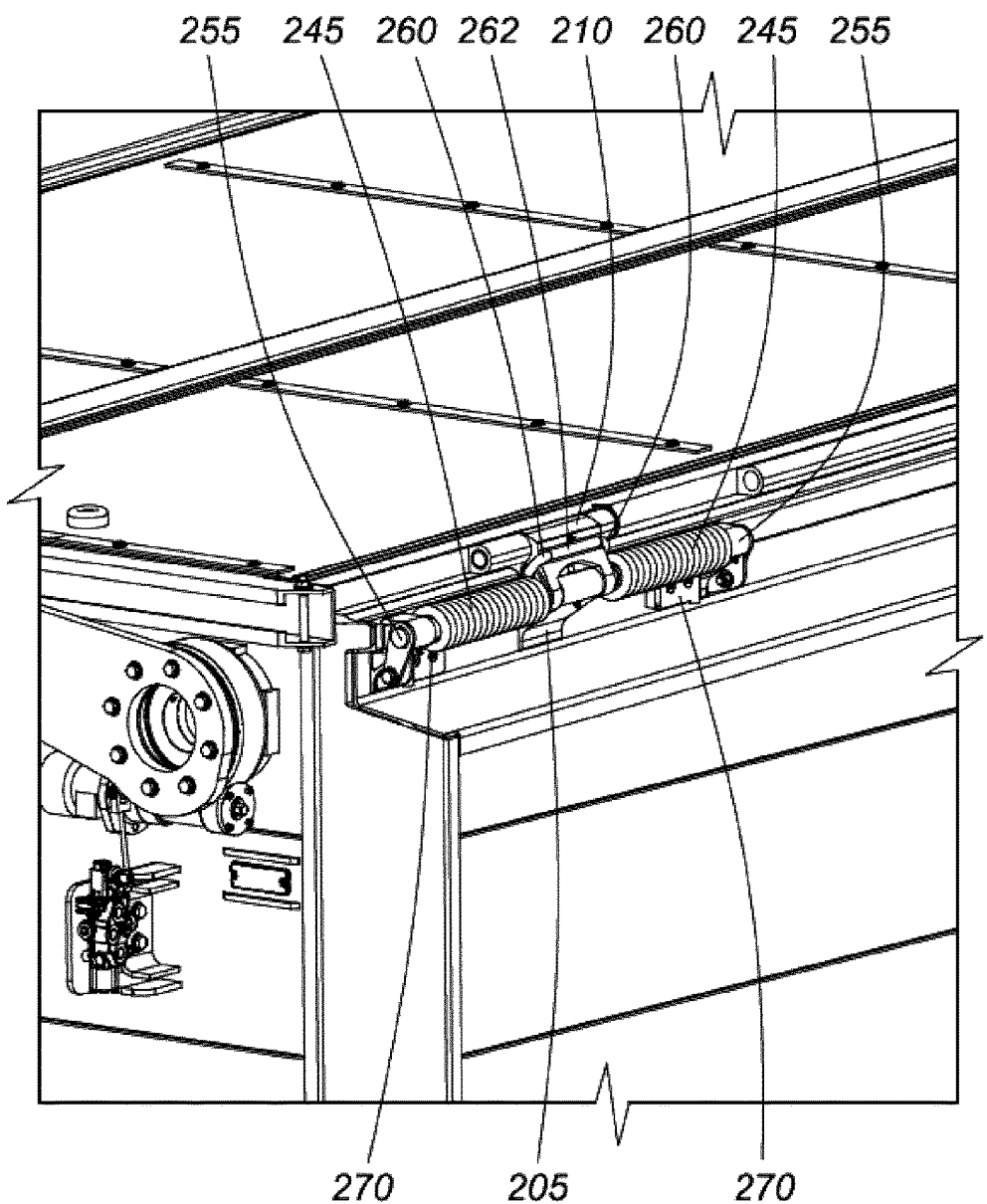
FIG. 15 is a partial rear perspective view of a cargo trailer showing the top door and hinge assembly in a fully closed position, wherein a resistance mechanism of the hinge assembly has an integral double spring and two supporting brackets.

The resistance mechanism 240 in some embodiments may also include a compound resistance mechanism, as shown in FIGS. 14 & 15. With reference to FIG. 14, the resistance mechanism 240 may have two sets of coil springs 245, hinge pin extensions 250, supporting brackets 255, and pads or spacers 270 mounted on opposite sides of the hinge assembly 135, and which are mirror-images of each other. As shown in FIG. 14, the respective first arms 260 of the coil springs 245 may be separate, or as shown in FIG. 15 they may be integrally joined in a shared first arm 262 such that the coil springs 245 are integral.

Figure 16:
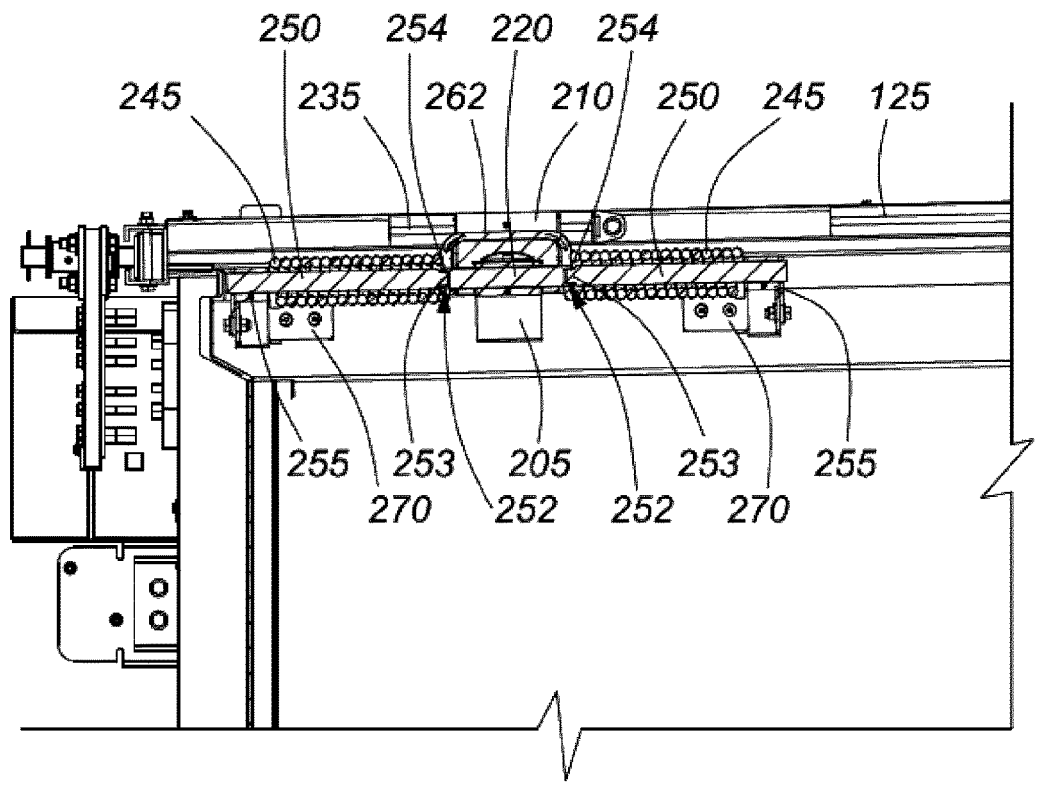
FIG. 16 is a partial cross-sectional side view of the cargo trailer of FIG. 15 showing an embodiment of a hinge pin and hinge pin extensions joined by hinge pin couplings.

In some embodiments, the hinge pin extension 250 may be integral with the hinge pin 220, while in other embodiments, as shown in FIG. 16, the hinge pin extension 250 may be separate from and coupled to the hinge pin 220 by a hinge pin coupling 252. For example, as shown in FIG. 16, each hinge pin extension 250 may have a coupling finger 253 received by a matching coupling detent 254 of the hinge pin 220 to couple each hinge pin extension 250 to the hinge pin 220. In some embodiments, the hinge pin 220 is rotatable about its axis in the hinge pin coupling 252 with each hinge pin extension 250, such that the hinge pin extension 250 is substantially free of rotation when the top door 125 is opened or closed and the hinge arm 210 rotates about the elbow 222. In other embodiments, the hinge pin coupling 252 may be fixed such that the hinge pin 220 and the hinge pin extension(s) 250 rotate together.

Where the top door 125 is mounted to the sidewall 115 using multiple hinge assemblies 135 each having a corresponding resistance mechanism 240 as described above, each corresponding resistance mechanism 240 may be differently configured in order to provide the desired operation of the hinge assembly 135 depending upon the particular mounting point and/or factors affecting the operation of the hinge assembly 135. For example, one or more of the hinge assemblies 135 may have a corresponding resistance mechanism 240 having a coil spring 245 which is longer, shorter, stronger, or weaker than one or more of the other hinge assemblies 135, or may have a particular number or size of pads or spacers 270 to provide a greater or lesser tension in the coil spring 245, and thus resisting force, than that of one or more other hinge assemblies 135. In this way, the resisting force of the resistance mechanisms 240 of multiple hinge assemblies 135 may be selectively configured in order to provide desirable cooperation of the hinge assemblies 135 to produce a smooth and repeatable opening and closing sequence of the top door 125.

In particular, the hinge assembly 135 may be so configured and selected as to produce the opening sequence now described.

In an initial state of the opening sequence, the top door 125 is in a fully closed position, and the top door opening mechanism 145, the hinge assembly 135 including the compound hinge 136 and the resistance mechanism 240 are all in respective first positions corresponding to the fully closed position of the top door 125. This stage of the opening sequence is shown in FIGS. 2-5.

Figure 6:
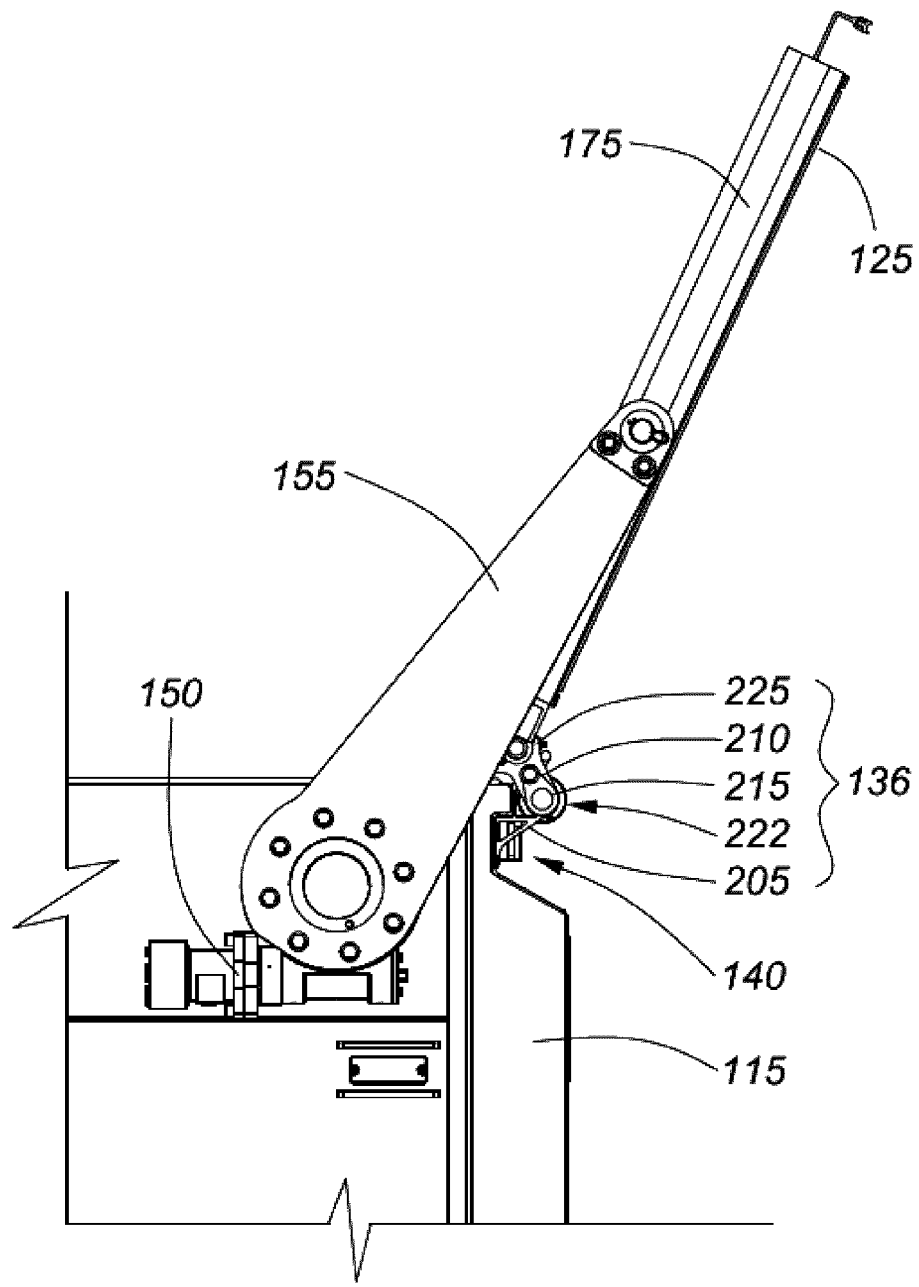
FIG. 6 is a partial end view of the cargo trailer of FIG. 1, showing the top door, hinge assembly, and top door opening mechanism in a partly open position in a first phase of an opening sequence of the top door.
Figure 7:
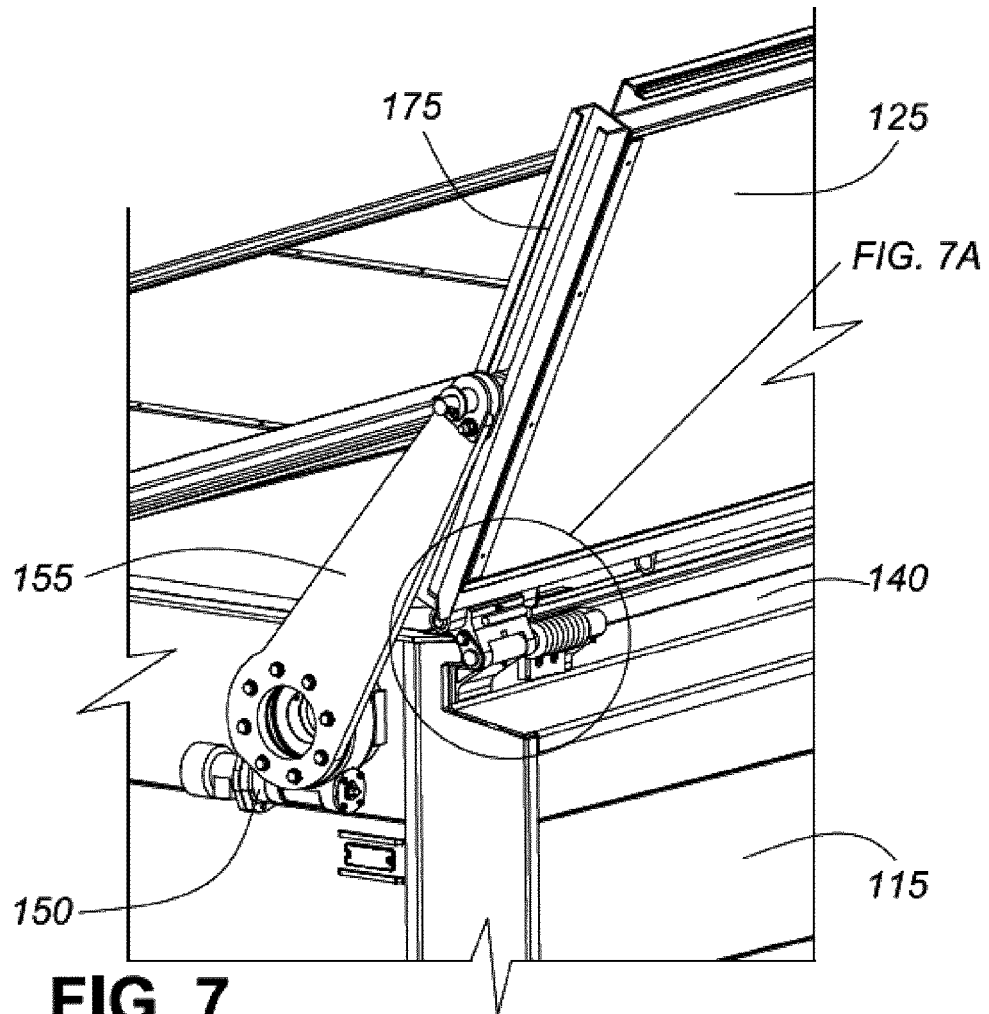
FIG. 7 is a partial rear perspective view of the cargo trailer of FIG. 1 showing the top door, hinge assembly, and top door opening mechanism in the partly open position in the first phase of the opening sequence of the top door.
Figure 7A:
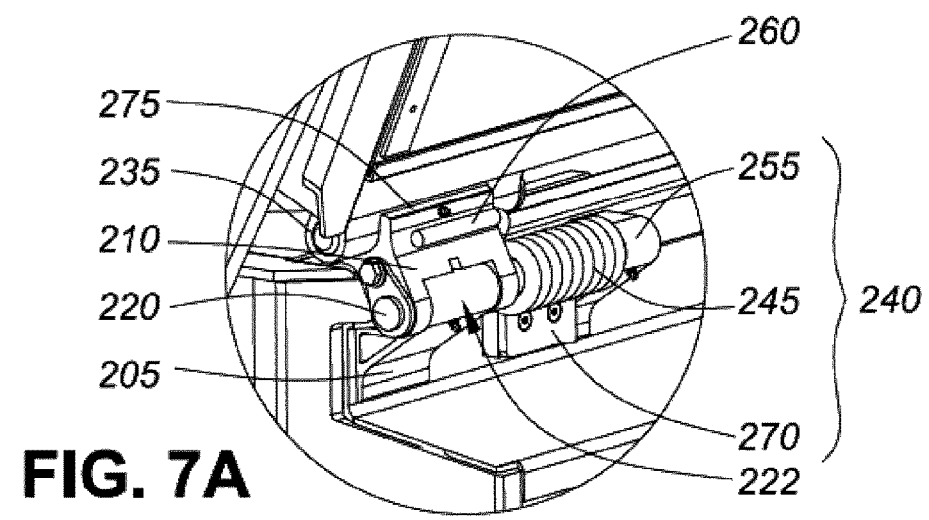
FIG. 7A is an inset view of FIG. 7 showing particularly the hinge assembly.

FIGS. 6-7A show a first phase of the opening sequence. In this phase, the resistance mechanism 240 resists hinged rotation of the hinge arm 210 about the elbow 222 with the hinge bracket 205. Thus, by action of the top door opening mechanism 145 the top door 125 hingedly rotates at the door knuckle 235, while the hinge arm 210 remains substantially stationary relative to the hinge bracket 205.

Figure 8:
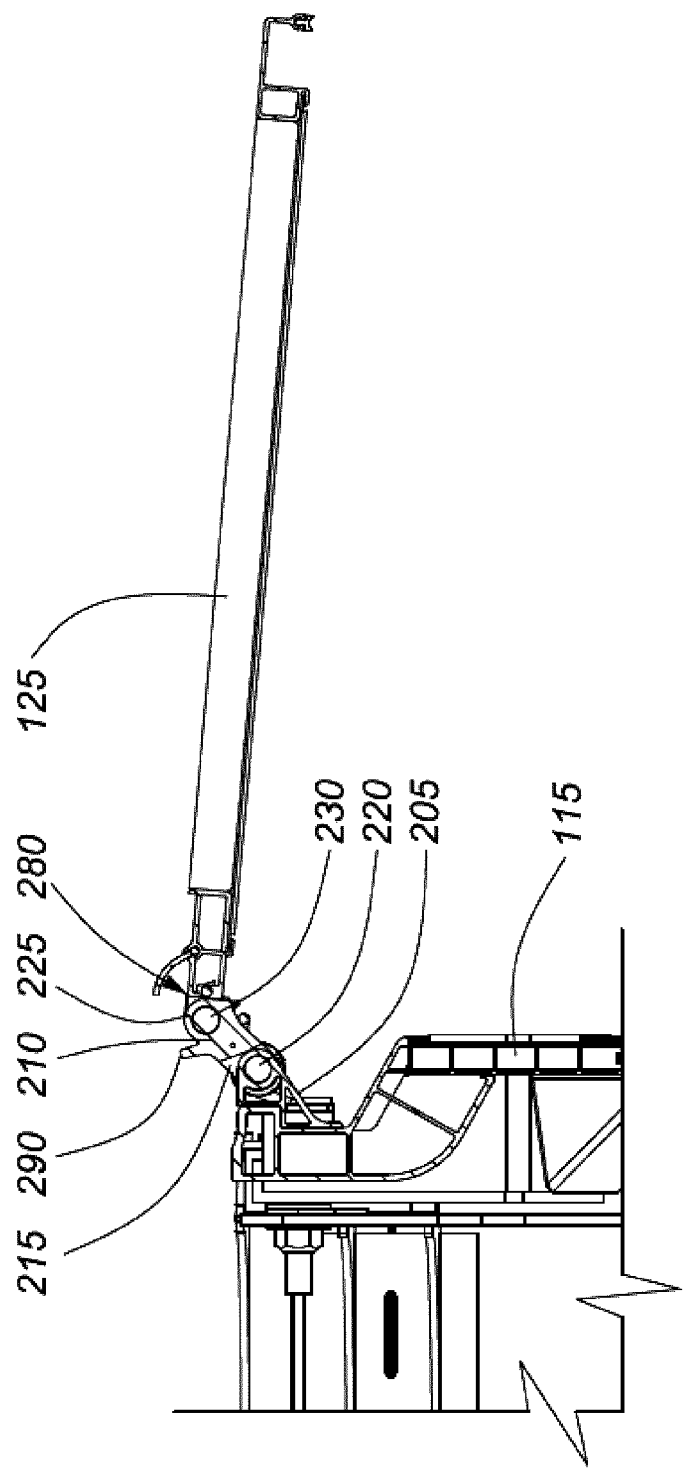
FIG. 8 is a partial cross-sectional end view of the cargo trailer of FIG. 1, showing the top door, hinge assembly, and top door opening mechanism in a partly open position in a second phase of the opening sequence of the top door.
Figure 9:
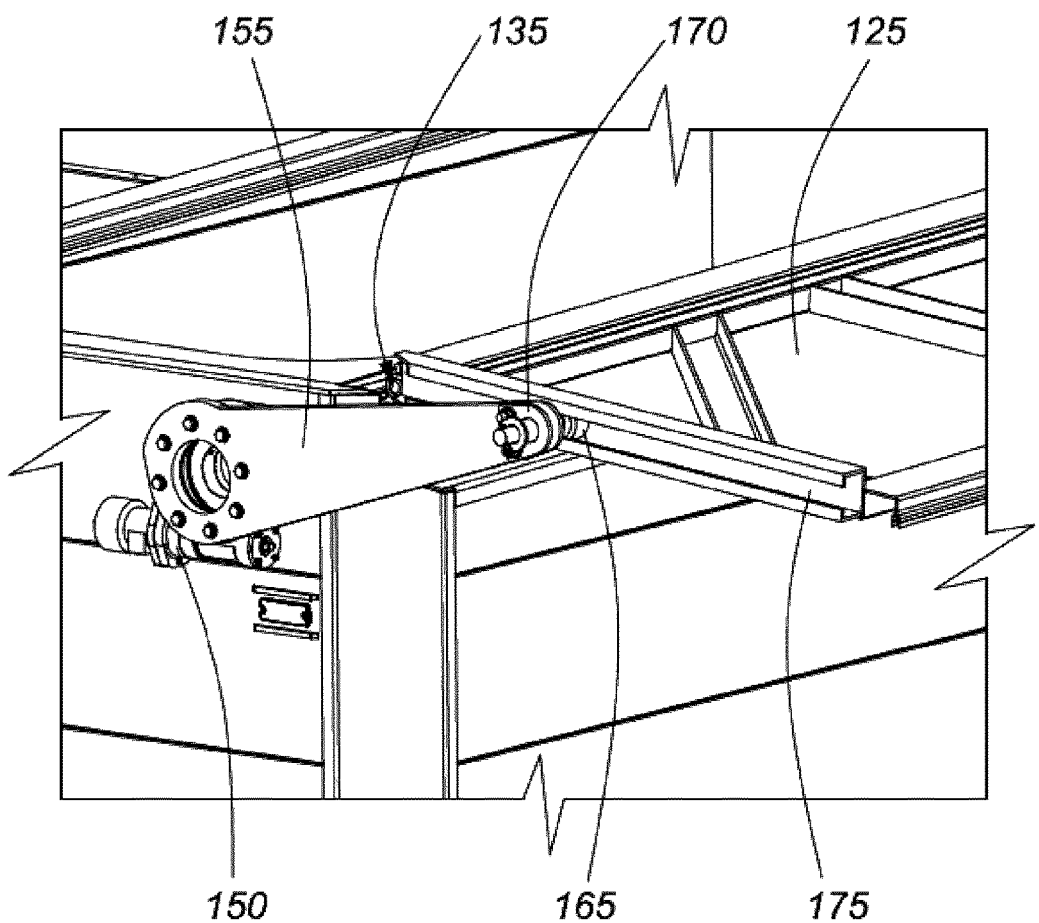
FIG. 9 is a partial rear perspective view of the cargo trailer of FIG. 1 showing the top door, hinge assembly, and top door opening mechanism in the partly open position in the second phase of the opening sequence of the top door.
Figure 10:
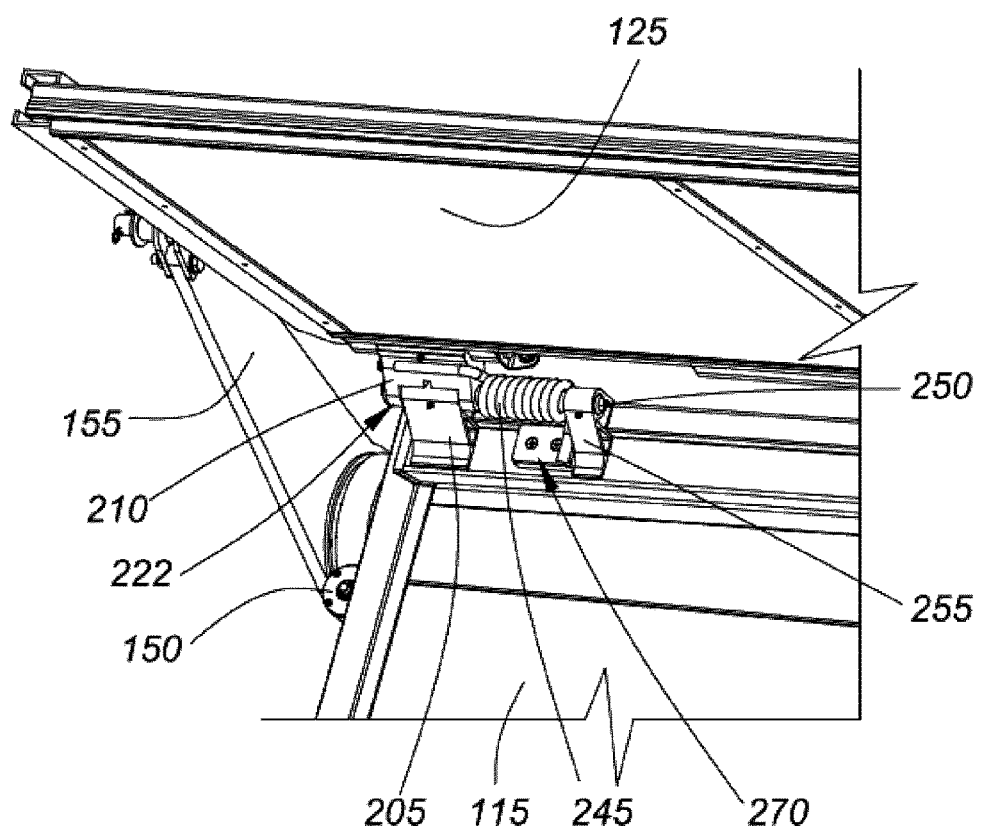
FIG. 10 is a partial underside perspective view of the cargo trailer of FIG. 1, showing the top door, hinge assembly, and top door opening mechanism in the partly open position in the second phase of the opening sequence of the top door.

FIGS. 8-10 show a second phase of the opening sequence. In this phase, the top door 125 no longer rotates hingedly at the door knuckle 235; instead, the hinge arm 210 rotates hingedly about the elbow 222 with the hinge bracket 205 against the resistance of the resistance mechanism 240. The hinge arm 210 may be shaped and configured with an opening stop 275 (shown especially in FIGS. 5 & 7A) which abuts an edge face 280 of the top door 225 (as shown especially in FIG. 8), whereby continued opening action of the top door opening mechanism 145 causes the top door 125 at its edge face 280 to push on the opening stop 275 causing the hinge arm 210 to rotate hingedly about the elbow 222 against the resistance of the resistance mechanism 240.

Figure 11:
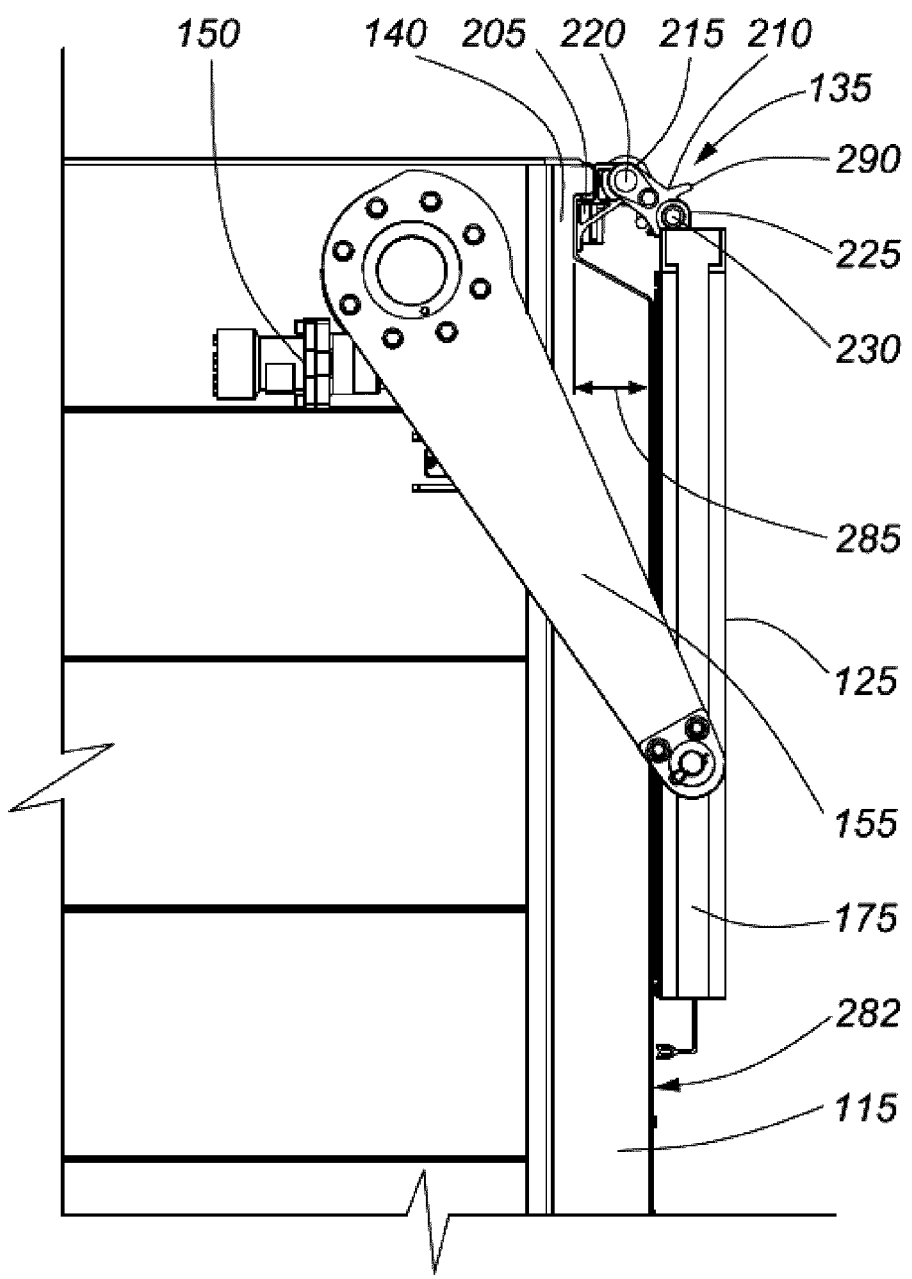
FIG. 11 is a partial end view of the cargo trailer of FIG. 1, showing the top door, hinge assembly, and top door opening mechanism in a fully open position.
Figure 12:
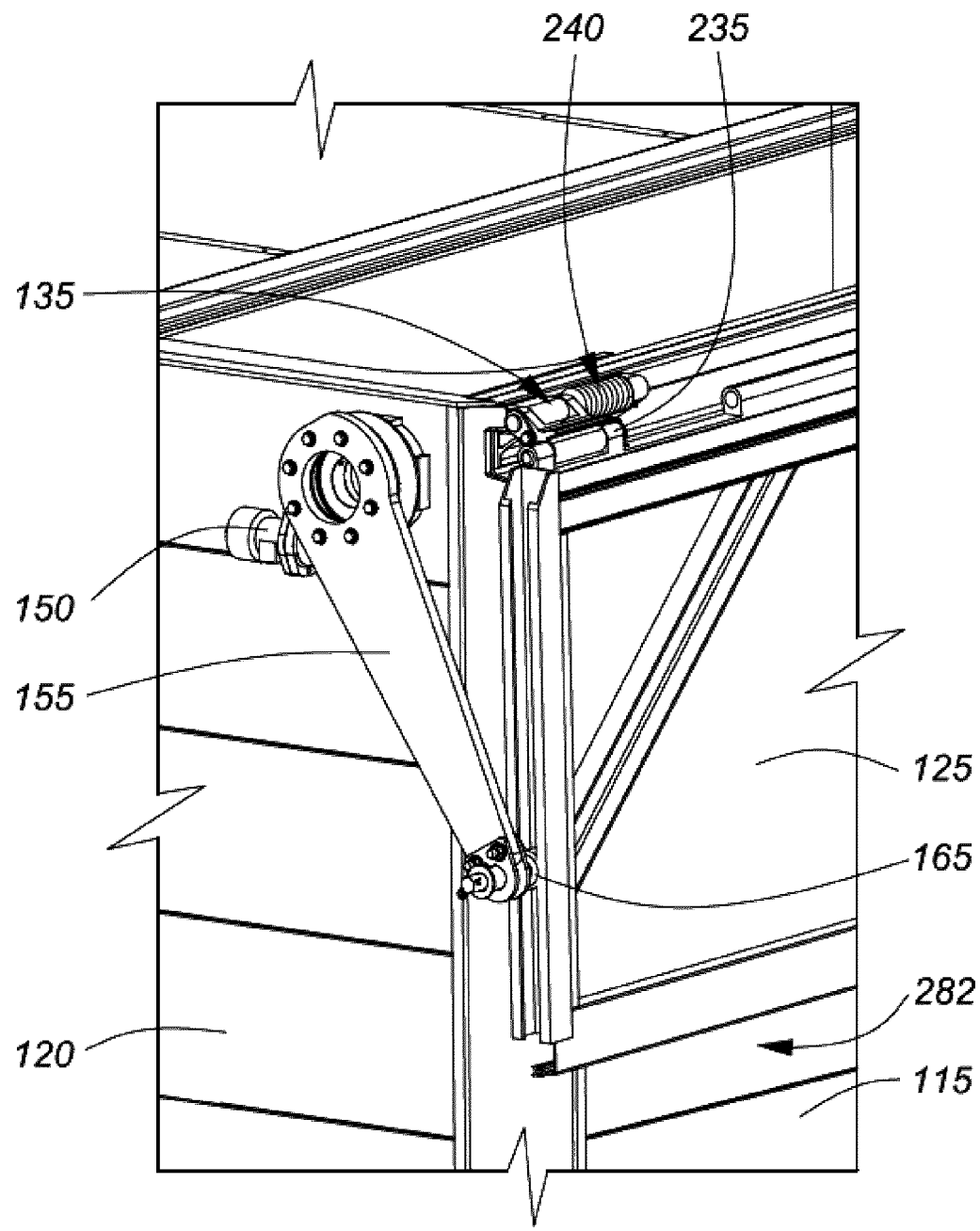
FIG. 12 is a partial rear perspective view of the cargo trailer of FIG. 1, showing the top door, hinge assembly, and top door opening mechanism in the fully open position.
Figure 13:
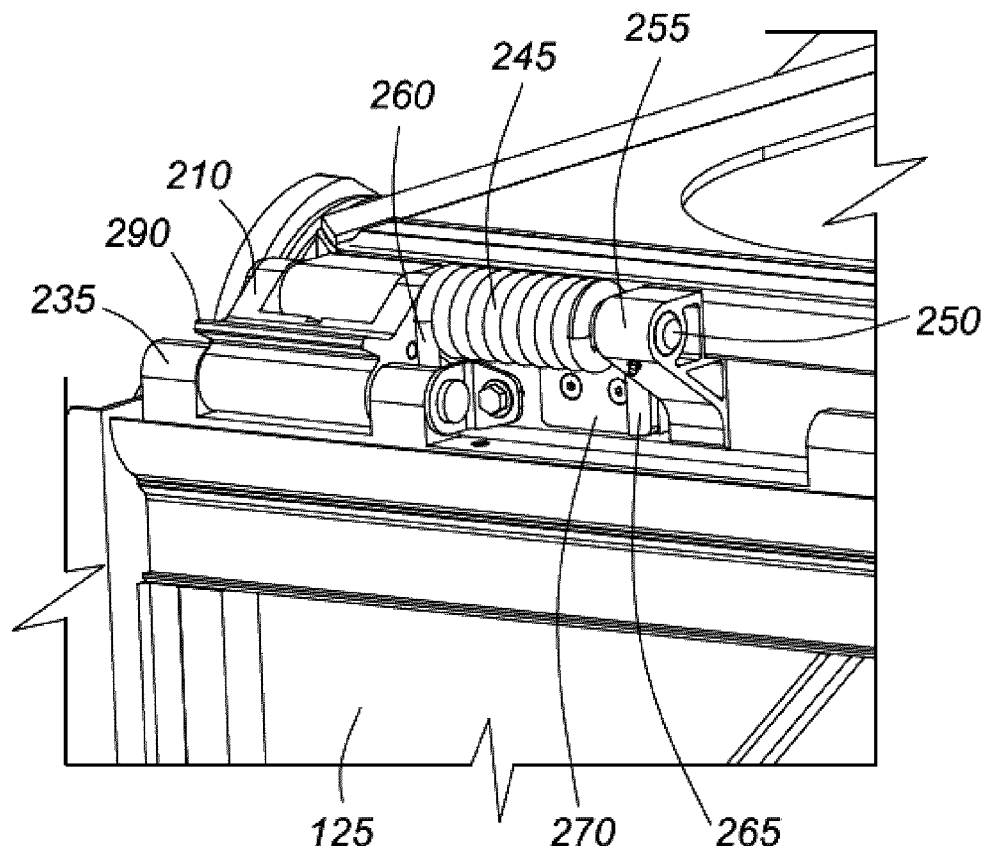
FIG. 13 is a partial front perspective view of the cargo trailer of FIG. 1, showing the top door and hinge assembly in the fully open position.

The top door opening mechanism 145 continues to open the top door 125 thusly through the second phase described above ending at a final state of the opening sequence when the top door 125 is in a fully open position as shown in FIGS. 11-13. As seen especially in FIG. 11, in the fully open position the top door 125 hangs vertically from the hinge assembly 135 and rests flush against the sidewall 115. As such, the top door 125 projects minimally, if at all, from the sidewall 115, in particular an outside surface 282 of the sidewall 115, and thus presents a minimum, if any, hazard to workers or equipment moving about the trailer 100.

As shown especially in FIG. 11, the top rail 140 of the sidewall 115 may include an offset or indent 285 to receive and accommodate the hinge assembly 135. The top rail 140 may be formed with the offset or indent 285 along an entire length of the sidewall 115, or instead only along a part of its length where a hinge assembly 135 is mounted.

A closing sequence of the top door 225 proceeds substantially as the opening sequence described above, but in reverse order, that is with the second phase proceeding first followed by the first phase. Optionally the hinge arm 210 may have a closing stop 290 (shown especially in FIG. 13) which contacts an adjacent surface of the top door 125 to cause or to assist the hinge arm 210 to rotate about the elbow 222 during closing of the top door 125. The resistance mechanism 240, including particularly the coil spring 245, may be selected and configured, along with the pads or spacers 270, such that the opening sequence described above is substantially precisely reversed in the closing sequence, such that the top door 125 does not contact the closing stop 290 until the fully closed position is reached. Even in such case, the closing stop 290 is nevertheless useful to support the top door 125 while in the fully closed position.

In this way, the top door 125 is rotatable through 270° from a fully closed, horizontal position, through a partly open, upwardly vertical position, through a partly open horizontal position, to a fully open, hanging vertical position wherein the top 125 door hangs vertically from the hinge assembly 135 and rests flush against an outside surface 282 of the corresponding sidewall 115, thereby minimizing any hazard to workers and equipment moving about the trailer 100. Moreover, as shown particularly in FIG. 2, no part of the hinge assembly 135 projects outwardly, or in other words overhangs, past the sidewall 115 when the top door 125 is in the fully closed position. As such, a width and height, and therefore a volume, of the container 105 may be maximized without compromise while complying with any regulations or other factors limiting total container width and height including door mounts.

Numerous variants and functional equivalents to the aspects and components of the above-described embodiments are possible. For example, while the above embodiments have the top door mounted to a sidewall of the container using the hinge assemblies, other embodiments have the top door mounted to an end wall of the container using the hinge assemblies, and the end wall may be a front wall or a back wall of the container. In such case, if the top door is openable using a top door opening mechanism, it may be mounted on an adjacent sidewall of the container. Similarly, while in the above embodiments the resistance mechanism has a coil spring mounted on an extension of a hinge pin supported by a supporting bracket, in other embodiments the resistance mechanism may have a leaf spring positioned at or mounted to the hinge arm, and which is compressed by opening motion of the hinge arm. In additional variants, while the top door opening mechanism in the above embodiments has a motor and rotating motor arm with a wheel received by a slot at an edge of the top door, in other embodiments the top door opening mechanism may include alternative known door opening means such as a geared or belt-driven drive coupled to rotate an axle at one or more of the hinge assembles. The principles disclosed herein are useful with all such known alternatives and functional equivalents.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A cargo trailer comprising:
   a container having a wall;
   a hinge assembly to mount the top door hingedly at or near an edge of the wall, the hinge assembly comprising:
      a compound hinge comprising:
         a hinge bracket fixedly mounted at a first end of the hinge bracket to the wall at or near the edge of the wall; and
         a hinge arm hingedly coupled at a first end of the hinge arm at an elbow with a second end of the hinge bracket; and
      a top door hingedly mounted at a knuckle of the top door with a second end of the hinge arm.

2. The cargo trailer according to claim 1, wherein the hinge assembly further comprises:
   a resistance mechanism coupled to the compound hinge to urge hinged rotation of the hinge arm about the elbow to a closed position of the hinge arm.

3. The cargo trailer according to claim 2, wherein the resistance mechanism comprises a coil spring.

4. The cargo trailer according to claim 3, wherein the coil spring encircles a hinge pin passing through the elbow and an opening of a supporting bracket mounted to the wall at a supporting bracket side of the coil spring opposite an elbow side of the coil spring adjacent the elbow, wherein an anchor arm of the coil spring adjacent the supporting bracket side of the coil spring presses at the wall adjacent the supporting bracket, and an elbow arm of the coil spring at the elbow side of the coil spring hugs a surface of the hinge arm, to urge the hinged rotation of the hinge arm about the elbow to the closed position of the hinge arm.

5. The cargo trailer according to claim 2, wherein the resistance mechanism comprises, on each of two opposing sides of the compound hinge, a coil spring encircling a hinge pin passing through the elbow and an opening of a supporting bracket mounted to the wall at a supporting bracket side of the coil spring opposite an elbow side of the coil spring adjacent the elbow, wherein an anchor arm of the coil spring adjacent the supporting bracket side of the coil spring presses at the wall adjacent the supporting bracket, and an elbow arm of the coil spring at the elbow side of the coil spring hugs a surface of the hinge arm, to urge the hinged rotation of the hinge arm about the elbow to the closed position of the hinge arm.

6. The cargo trailer according to claim 5, wherein the hinge pin passes through the elbow, both coil springs, and both supporting brackets.

7. The cargo trailer according to claim 1, wherein the hinge assembly is located fully inside a vertical plane of an outside surface of the wall when the top door is in a fully closed position.

8. The cargo trailer according to claim 1, wherein the hinge arm is hingedly rotatable about the elbow to suspend the top door substantially vertically from the knuckle when the top door is in a fully open position.

9. The cargo trailer according to claim 8 where the top door rests flush against an outside surface of the wall when the top door is in the fully open position.

10. The cargo trailer according to claim 1 further comprising a top rail at the edge of the wall, wherein the hinge assembly is mounted to the top rail.

11. The cargo trailer according to claim 10, wherein the top rail comprises an indentation or offset of the wall inwardly from an outward surface of the wall so as to form a space to receive the hinge assembly.

12. The cargo trailer according to claim 11, wherein the indentation or offset is sized and shaped such that the hinge assembly is located fully inside a vertical plane of an outward surface of the wall when the top door is in a fully closed position.

13. The cargo trailer according to claim 1 further comprising:
   a top door opening mechanism mounted to the container and coupled to the top door selectively to open and close the top door.

14. The cargo trailer according to claim 13, wherein the top door opening mechanism comprises a motor arm mounted at a first end of the motor arm to the container at a motor arm pivot and rotatably driven by a motor about the motor arm pivot, and a wheel or pin mounted at a second end of the motor arm, wherein the wheel or pin is slidably or rollably received in a slot or rail at an adjacent edge of the top door, wherein rotation of the motor arm about the first end causes the wheel or pin to urge the top door selectively to open or close.

15. The cargo trailer according to claim 1, wherein the hinge arm comprises an opening stop sized and shaped to contact an edge surface of the top door at a preconfigured position of the top door in an opening sequence of the top door, wherein further opening of the top door causes the top door to press the opening stop causing the hinge arm to rotate hingedly about the elbow.

16. The cargo trailer according to claim 1, wherein in a first phase of an opening sequence of the top door, the top door hingedly rotates at the knuckle about the second end of the hinge arm while the hinge arm remains substantially free of hinged rotation about the elbow, and wherein in a second phase of the opening sequence following the first phase the hinge arm hingedly rotates at the elbow while the top door is substantially free of hinged rotation at the knuckle at the second end of the hinge arm.

17. The cargo trailer according to claim 16, wherein a closing sequence of the top door comprises the second phase of the opening sequence followed by the first phase of the opening sequence.

18. The cargo trailer according to claim 1, wherein the wall of the container is a sidewall of the container.

19. The cargo trailer according to claim 18, wherein the edge of the sidewall is an upper edge of the sidewall.

* * * * *